(12) United States Patent
Jancsary et al.

(10) Patent No.: US 9,396,523 B2
(45) Date of Patent: Jul. 19, 2016

(54) IMAGE RESTORATION CASCADE

(71) Applicant: Microsoft Corporation, Redmond, WA (US)

(72) Inventors: Jeremy Jancsary, Cambridge (GB); Reinhard Sebastian Bernhard Nowozin, Cambridge (GB); Carsten Curt Eckard Rother, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 13/949,940

(22) Filed: Jul. 24, 2013

(65) Prior Publication Data
US 2015/0030237 A1    Jan. 29, 2015

(51) Int. Cl.
*G06K 9/00* (2006.01)
*G06T 5/00* (2006.01)
*G06K 9/62* (2006.01)

(52) U.S. Cl.
CPC .............. *G06T 5/001* (2013.01); *G06K 9/6282* (2013.01); *G06T 2207/20081* (2013.01)

(58) Field of Classification Search
CPC ................... G06T 5/002; G06T 5/003; G06T 2207/20182; G06T 5/00; G06T 5/001; G06T 5/005; G06T 5/006; G06T 5/007; G06T 2207/20201
See application file for complete search history.

(56) References Cited

U.S. PATENT DOCUMENTS 5,627,918 A    5/1997 Carasso

| | | | |
|---|---|---|---|
| 2005/0265629 A1* | 12/2005 | Fu | G06K 9/00516 382/275 |
| 2007/0175998 A1* | 8/2007 | Lev | G06F 17/30876 235/454 |
| 2008/0025627 A1 | 1/2008 | Freeman et al. | |

OTHER PUBLICATIONS

Chen et al., Image Denoising Based on Combined Neural Networks Filter, 2009, International Conference on Information Engineering and Computer Science, pp. 1-4.*
Wikipedia article on Backpropagation dated Jul. 18, 2012.*
Kohonen, T., The self-organizing map, 1998, Neurocomputing, vol. 21, pp. 1-6.*

(Continued)

*Primary Examiner* — Stephen R Koziol
*Assistant Examiner* — Jonathan S Lee
(74) *Attorney, Agent, or Firm* — Tom Wong; Micky Minhas; Zete Law, P.L.L.C.

(57) ABSTRACT

Image restoration cascades are described, for example, where digital photographs containing noise are restored using a cascade formed from a plurality of layers of trained machine learning predictors connected in series. For example, noise may be from sensor noise, motion blur, dust, optical low pass filtering, chromatic aberration, compression and quantization artifacts, down sampling or other sources. For example, given a noisy image, each trained machine learning predictor produces an output image which is a restored version of the noisy input image; each trained machine learning predictor in a given internal layer of the cascade also takes input from the previous layer in the cascade. In various examples, a loss function expressing dissimilarity between input and output images of each trained machine learning predictor is directly minimized during training. In various examples, data partitioning is used to partition a training data set to facilitate generalization.

20 Claims, 10 Drawing Sheets

(56) References Cited

OTHER PUBLICATIONS

Boland, M.V., Quantitative Description and Automated Classification of Cellular Protein Localization Patterns in Fluorescence Microscope Images of Mammalian Cells [Back-Propagation Neural Networks sub-section], 1999, Dissertation.*
Chen, Yongjian, et al. "Additive and multiplicative noise reduction by back propagation neural network." Engineering in Medicine and Biology Society, 2007. EMBS 2007. 29th Annual International Conference of the IEEE. IEEE, 2007.*
Gacsádi, A., C. Grava, and A. Grava. "Medical image enhancement by using cellular neural networks." Computers in Cardiology 32.1 (2005): 821-824.*
Ferhat, Fillali, Maza Sofiane, and Graini Abid. "Image Restoration using a Network of Reduced and Regularized Neural Networks." International Journal of Computer Applications 54.8 (2012).*
Jurrus, Elizabeth, et al. "Detection of neuron membranes in electron microscopy images using a serial neural network architecture." Medical image analysis 14.6 (2010): 770-783.*
Fukushima, Kunihiko. "Restoring partly occluded patterns: a neural network model." Neural Networks 18.1 (2005): 33-43.*
Couzinie-Devy, et al., "Learning to Estimate and Remove Non-Uniform Image Blur", In 26th IEEE Conference on Computer Vision and Pattern Recognition, Apr. 19, 2013, 8 pages.
Colonnese, et al., "Blind Image Deblurring Driven by Nonlinear Processing in the Edge Domain", in EURASIP Journal on Applied Signal Processing, vol. 2004, Jan. 2004, 14 pages.
Ji, et al., "A Two-Stage Approach to Blind Spatially-Varying Motion Deblurring", In IEEE Conference on Computer Vision and Pattern Recognition, Jun. 16, 2012, 8 pages.
Sun, et al., "Edge-based Blur Kernel Estimation Using Patch Priors", In Proceedings of the IEEE International Conference on Computational Photography, Apr. 19, 2013, 8 pages.
Zhang, et al., "Sparse Representation Based Blind Image Deblurring", In IEEE International Conference on Multimedia and Expo, Jul. 11, 2011, 6 pages.
Tai, et al., "Motion-Aware Noise Fltering for Deblurring of Noisy and Blurry Images", In IEEE Conference on Computer Vision and Pattern Recognition, Jun. 16, 2012, 8 pages.
Arbelaez, et al., "Contour Detection and Hierarchical Image Segmentation", In Proceedings of IEEE Transactions on Pattern Analysis and Machine Intelligence, vol. 33, Issue 5, May, 2011, 19 pags.
Barbu, Adrian, "Learning Real-Time MRF Inference for Image Denoising", In Proceedings of IEEE Conference on Computer Vision and Pattern Recognition, Jun. 20, 2009, 8 pages.
Black, et al., "On the Unification of Line Processes, Outlier Rejection, and Robust Statistics with Applications in Early Vision", In Journal of International Computer Vision, vol. 19, Issue 1, Jul. 1996, 53 pages.
Burger, et al., "Image Denoising: Can Plain Neural Networks Compete with BM3D?", In Proceedings of IEEE Conference on Computer Vision and Pattern Recognition, Jun. 16, 2012, 8 pages.
Charbonnier, et al., "Two Deterministic Half-quadratic Regularization Algorithms for Computed Imaging", In Processing of IEEE International Conference Image Processing, Nov. 13, 1994, 5 pages.
Cho, et al., "Fast Motion Deblurring", In Journal of ACM Transactions on Graphics, vol. 28, Issue 5, Dec. 2009, 8 pages.
Fergus, et al., "Removing Camera Shake from a Single Photograph", In Journal of ACM Transactions on Graphics, vol. 25, Issue 3, Jul. 2006, 8 pages.
Frohlich, et al., "As Time Goes by—Anytime Semantic Segmentation with Iterative Context Forests", In Proceedings of the 34th Annual Symposium of the German Association for Pattern Recognition, Aug. 28, 2012, 10 pages.
Gao, et al., "How Well Do Filter-Based MRFs Model Natural Images?", In Proceedings of Pattern Recognition—Joint 34th DAGM and 36th OAGM Symposium, Aug. 28, 2012, 10 pages.
Geman, et al., "Constrained Restoration and the Recovery of Discontinuities", In Proceedings of IEEE Transactions on Pattern Analysis and Machine Intelligence, vol. 14, Issue 3, Mar. 1992, 17 pages.
Geman, et al., "Nonlinear Image Recovery with Half-quadratic Regularization", In Journal of IEEE Transactions on Image Processing, vol. 4, Issue 7, Jul. 1995, 15 pages.
Hinton, et al., "A Fast Learning Algorithm for Deep Belief Nets", In Journal of Neural Computation, vol. 18, Issue 7, Jul. 2006, 16 pages.
Jancsary, et al., "Loss-Specific Training of Non-Parametric Image Restoration Models: A New State of the Art", In Proceedings of the 12th European Conference on Computer Vision, vol. Part VII, Oct. 7, 2012, 14 pages.
Jancsary, et al., "Regression Tree Fields—An Efficient, Non-Parametric Approach to Image Labeling Problems", In IEEE Conference on Computer Vision and Pattern Recognition, Apr. 10, 2012, 8 pages.
Kohler, et al., "Recording and Playback of Camera Shake: Benchmarking Blind Deconvolution with a Real-World Database", In Proceedings of the 12th European Conference on Computer Vision, vol. Part VII, Oct. 7, 2012, 14 pages.
Krishnan, et al., "Fast Image Deconvolution using Hyper-Laplacian Priors", In Proceedings of Advances in Neural Information Processing Systems, Dec. 2009, 9 pages.
Levin, et al., "Image and Depth from a Conventional Camera with a Coded Aperture", In Journal of ACM Transactions on Graphics, vol. 26, Issue 3, Jul. 2007, 10 pages.
Levin, et al., "Efficient Marginal Likelihood Optimization in Blind Deconvolution", In Proceedings of the IEEE Conference on Computer Vision and Pattern Recognition, Jun. 20, 2011, 8 pages.
Levin, et al. "Understanding and Evaluating Blind Deconvolution Algorithms", In IEEE Conference on Computer Vision and Pattern Recognition, Jun. 20, 2009, 8 pages.
Lucy, L. B., "An Iterative Technique for the Rectification of Observed Distributions", In Proceedings of Astronomical Journal, vol. 79, Jun. 1974, 5 pages.
Palmer, et al., "Variational EM Algorithms for Non-Gaussian Latent Variable Models", In Proceedings of Advances in Neural Information Processing Systems, Dec. 5, 2005, 8 pages.
Richardson, William Hadley, "Bayesian-Based Iterative Method of Image Restoration", In Journal of the Optical Society of America, vol. 62, Issue 1, Jan. 1972, 5 pages.
Roth, et al., "Fields of Experts", In International Journal of Computer Vision, vol. 82, Issue 2, Apr. 2009, 25 pages.
Schmidt, et al., "Bayesian Deblurring with Integrated Noise Estimation", In Proceedings of the IEEE Conference on Computer Vision and Pattern Recognition, Jun. 21, 2011, 8 pages.
Tappen, et al., "Learning Gaussian Conditional Random Fields for Low-Level Vision", In Proceeding of IEEE Computer Society Conference on Computer Vision and Pattern Recognition, Jun. 18, 2007, 8 pages.
Tu, Zhuowen, "Auto-Context and its Application to High-Level Vision Tasks", In Journal of IEEE Conference on Computer Vision and Pattern Recognition, Jun. 23, 2008, 8 pages.
Wainwright, et al., "Scale Mixtures of Gaussians and the Statistics of Natural Images", In Proceedings of Advances in Neural Information Processing Systems, Nov. 29, 1999, 7 pages.
Xu, et al., "Two-Phase Kernel Estimation for Robust Motion Deblurring", In Proceedings of the 11th European Conference on Computer Vision, Part I, Sep. 5, 2010, 14 pages.
S Cho, J Wang and S.Lee, "Handling Outliers in non-blind image deconvolution" ICCV 2011, Nov. 6, 2011. 8 Pages.
L Yuan, J Sun, L Quan and H-Y Shum. "Progressive inter-scale and intra-scale non-blind image deconvolution". ACM T. Graphics 27(3), Aug. 2008. 9 Pages.
Schmidt, et al; "Discriminative Non-Blind Deblurring" IEEE conf an Computer Vision and Pattern Recognition, Portland or, Jun. 2013. 8 Pages.
Jancsary et al; U.S. Appl. No. 13/862,415, filed Apr. 14, 2013 entitled "Image Deblurring".

* cited by examiner

IMAGE RESTORATION CASCADE

BACKGROUND

Digital photographs are often of reduced quality because of corruption by any one or more of a number of noise sources. For example, sensor noise, motion blur due to movement of the camera or subject during the exposure time, occlusion due to dust, optical low pass filtering, chromatic aberration, compression and quantization artifacts, down sampling and other sources of noise.

Existing digital image restoration processes aim to improve image quality by processing digital images to remove effects of the noise sources. For example, statistical models of natural images and imaging systems may be used to try to remove the effects of noise sources. There is an ongoing desire to improve digital image restoration processes both to improve quality of the output images and to reduce the costs involved (time costs, resource costs, usability and other costs).

The embodiments described below are not limited to implementations which solve any or all of the disadvantages of known image restoration processes and equipment.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Image restoration cascades are described, for example, where digital photographs containing noise are restored using a cascade formed from a plurality of layers of trained machine learning predictors connected in series. For example, noise may be from sensor noise, motion blur, dust, optical low pass filtering, chromatic aberration, compression and quantization artifacts, down sampling or other sources. For example, given a noisy image, each trained machine learning predictor produces an output image which is a restored version of the noisy input image; each trained machine learning predictor in a given internal layer of the cascade also takes input from the previous layer in the cascade. In various examples, a loss function expressing the quality of restoration between input and output images of each trained machine learning predictor is directly optimized during training. In various examples, data partitioning is used to partition a training data set to facilitate generalization.

In various examples at least some of the predictors are non-parametric. In various examples, different restored versions of the image (from different predictors or different layers of the cascade) are available to a user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a camera phone, the system described is provided as an example and not a limitation. As those skilled in the art will appreciate, the present examples are suitable for application in a variety of different types of image processing systems.

Figure 1:
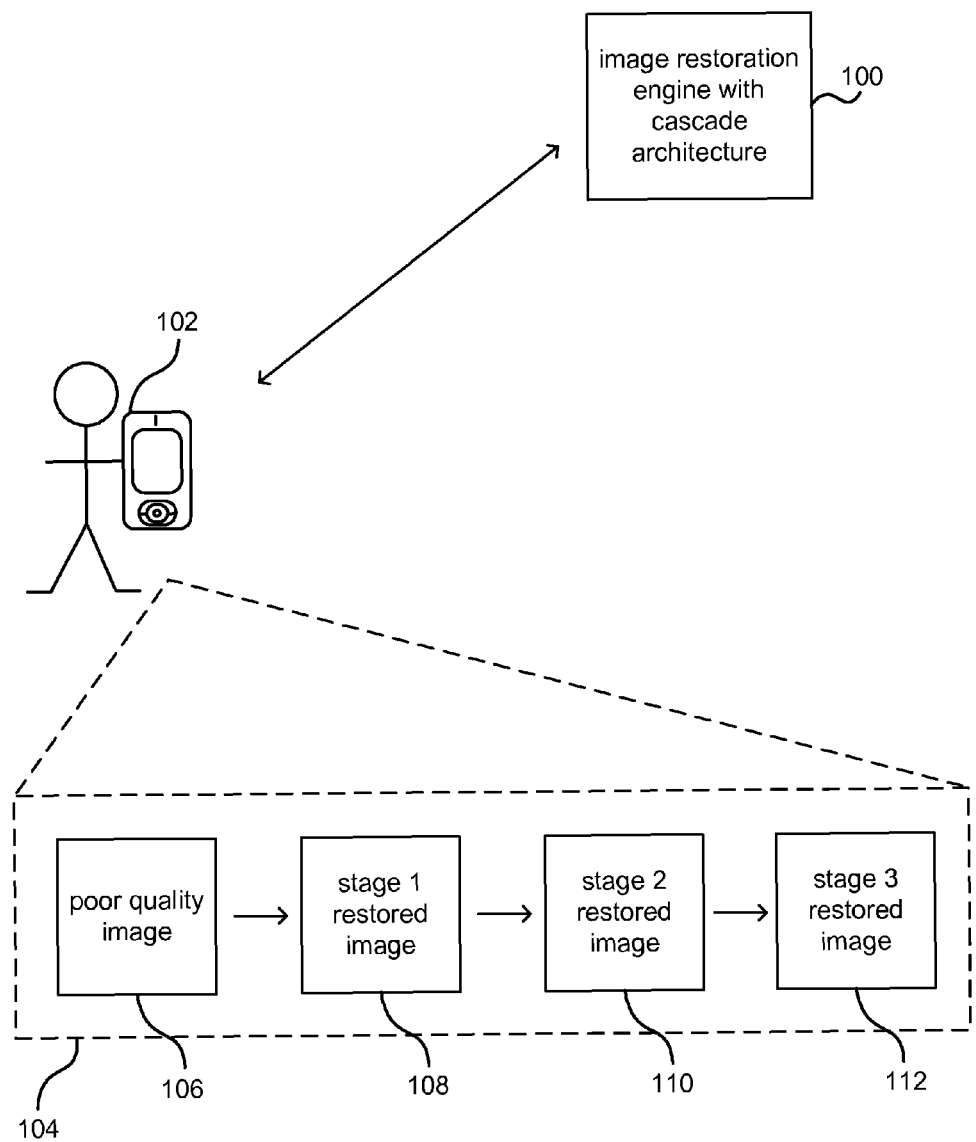
FIG. 1 is a schematic diagram of an image restoration engine used to produce restored versions of a poor quality image.

FIG. 1 is a schematic diagram of an image restoration engine 100 used to produce one or more restored versions 108, 110, 112 of a poor quality image 106. In this example a camera phone 102 is used to capture an image of a scene and the resulting image is a poor quality image 106 because of one or more sources of noise. For example, noise may be introduced by any one or more of: the camera phone sensor, motion blur due to movement of the camera phone or objects in the scene during the exposure time, dust on the camera phone, optical low pass filtering applied to the captured image, chromatic aberration introduced by the camera phone, compression and/or quantization artifacts due to processing of the captured image, down sampling of the captured image, or other noise sources.

An image restoration engine 100 with a cascade architecture is used to restore the poor quality image. The image restoration engine 100 is computer implemented using software and/or hardware. It has a cascade architecture comprising a plurality of layers of trained machine learning predictors connected in series. Each trained machine learning predictor receives data from the poor quality image as input and produces a restored version of the image as output. In addition, those predictors which are in internal layers (i.e. not the initial layer) receive input from at least the immediately preceding layer. Each layer comprises one or more trained machine learning predictors. So a layer can be thought of as a column having one or more rows as explained in more detail below. In some examples connections between rows are used. The predictors are trained using training data which is partitioned so that different predictors are trained using different training data. This improves the ability of the image restoration engine to generalize, that is, to produce good results for images other than the training data. During training a loss function may be used to direct the training process where the loss function expresses a quality of restoration between the input and output images.

A display at smart phone 102 may show the poor quality image 106 followed by several restored versions of the image 108, 110, 112 each having further improved quality. Each restored version is an output of a layer of the cascade architecture. The restored versions may be displayed in sequence (on the same display or on successive displays) as they become available from layers of the cascade architecture. A user may select one of the restored versions with acceptable quality so that processing through further layers of the cascade is stopped. For example, users see a series of restored images each better than the last and are able to stop processing by selecting an image.

In the example shown in FIG. 1 the image restoration engine 100 is located in the cloud and is accessible to the camera phone 102 via a communications network such as the internet or any other suitable communications network. However, it is also possible for the image restoration engine 100, in whole or in part, to be integral with the camera phone 102.

In the example shown in FIG. 1 the camera phone 102 sends the poor quality image 106 to the image restoration engine 100 which is in communication with the camera phone 102 over a communications network. The image restoration engine 100 calculates a plurality of restored versions of the image and returns one or more of the restored versions to the camera phone 102. The images may be compressed prior to sending in order to reduce the amount of communications bandwidth; and decompressed when received.

The image restoration engine 100 may comprise one or more graphics processing units or other parallel processing units arranged to perform parallel processing of image elements.

For example, the functionality of the image restoration engine described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Figure 2:
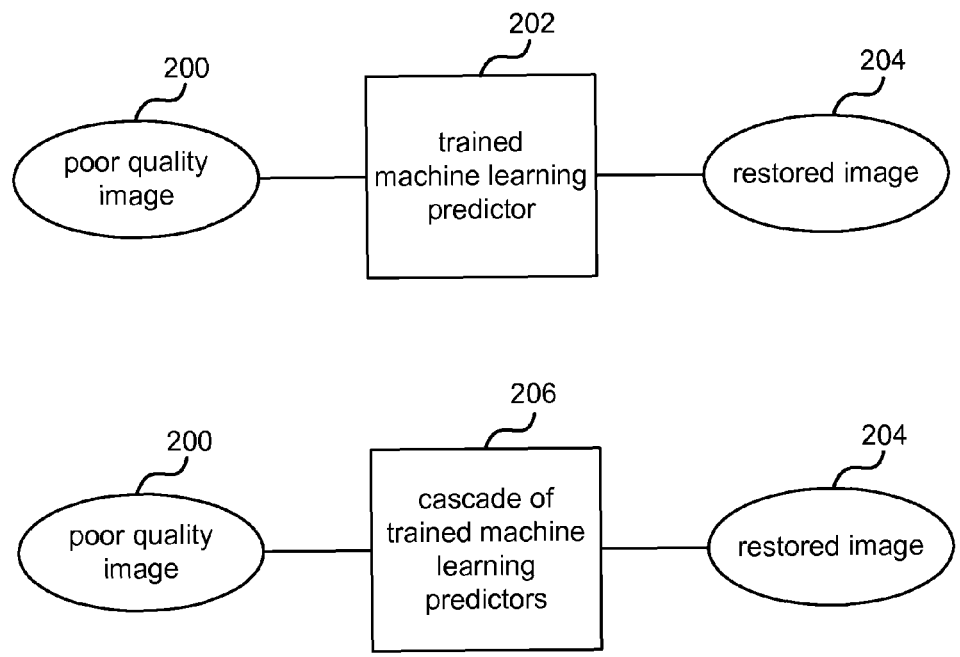
FIG. 2 is a schematic diagram of a trained machine learning predictor and a cascade of trained machine learning predictors.

More detail about the image restoration engine is now given with respect to FIG. 2. A poor quality image 200 such as a digital photograph, medical image, depth image, or any other two or higher dimensional image is provided as input to a trained machine learning predictor 202. The image 200 is of poor quality because it has been subject to one or more sources of noise as described above. The trained machine learning predictor 202 comprises statistical models of natural images and imaging systems for removing the effects of noise sources and it outputs a restored image 204 and optionally also, certainty information associated with the restored image. In the examples described herein a cascade of trained machine learning predictors 206 is used. The cascade comprises a plurality of layers of trained machine learning predictors connected in series. Each layer may output a restored image 204.

For example, a machine learning predictor may be any combination of one or more of: a neural network, a linear regression model, a regression tree, a regression tree field (RTF). The machine learning predictor may be non-parametric which means that the predictor is not limited to a specific form so that as more training images are used the predictor is becoming more expressive and this may give benefits because the properties of natural images (photographs) are complex and difficult to model accurately.

A regression tree field is a plurality of regression trees used to represent a conditional random field. A conditional random field (CRF) is a statistical model for predicting a label of an image element by taking into account other image elements in the image. A Gaussian conditional random field comprises unary potentials and pair-wise potentials. In an RTF one or more regression trees may be associated with unary potentials of a conditional random field and one or more regression trees may be associated with pairwise potentials of a conditional random field. Unary potentials are related to individual image elements. Pair-wise potentials are related to pairs of image elements. Each leaf of the regression tree may store an individual linear regressor that determines a local potential.

A regression tree comprises a root node connected to a plurality of leaf nodes via one or more layers of split nodes. Image elements of an image may be pushed through a regression tree from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. During training, image statistics (also referred to as features) are chosen for use at the split nodes and parameters are stored at the leaf nodes. These parameters are then chosen so as to optimize the quality of the predictions (as measured by a loss function) on the training set. After training, image elements and/or features of an input poor quality image are pushed through the regression trees to find values of the parameters.

Regression tree fields are described in U.S. patent application Ser. No. 13/337,324 "Regression Tree Fields" filed on 27 Dec. 2011. Regression tree fields are also described in Jancsary et al. "Regression tree fields—an efficient, non-parametric approach to image labeling problems" CVPR 2012, and in Jancsary et al. "Loss-specific Training of Non-Parametric Image Restoration Models: A New State of the Art", ECCV 2012.

Figure 3:
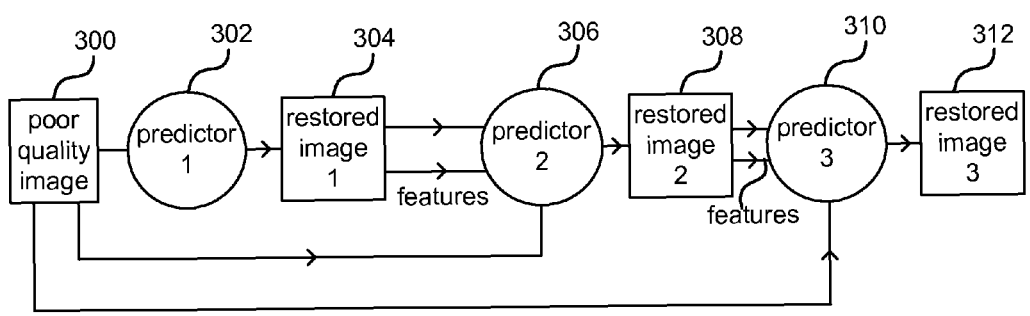
FIG. 3 is a schematic diagram of a cascade of trained machine learning predictors.

FIG. 3 is a schematic diagram of a cascade of trained machine learning predictors 302, 306, 310. In this example each layer of the cascade comprises a single machine learning predictor which produces a restored image (304, 308, 312) as output. That is, each machine learning predictor 302, 306, 310 is a layer of the cascade. The predictors 302, 306, 310 are connected in series. Three cascade layers are shown in this example. However the number of cascade layers may be different. There can be two or more cascade layers depending on the particular task involved and the computational resources available.

Predictor 2 306 and predictor 3 310 may be referred to as internal layers. A predictor in an internal layer receives input which is the output of the previous layer. For example, predictor 2 306 receives input which is restored image 1 304 output by predictor 1 302. The initial layer comprises predictor 1 which receives input from the poor quality image 300 as do the other layers. That is, each layer receives the poor quality image 300 as input.

In some examples, features are computed from one or more of the restored images. The features may be lines, corners, edges, blobs, textures, or any other image features. The features are computed using one or more image feature computation processes. For example, filters such as edge filters may be applied from a bank or store of available filters. As indicated in FIG. 3 features may be computed from a restored image and provided as input to a subsequent layer of the cascade. A predictor in an internal layer may receive input which is the restored image output from the immediately previous layer and features computed from that restored image.

Figure 4:
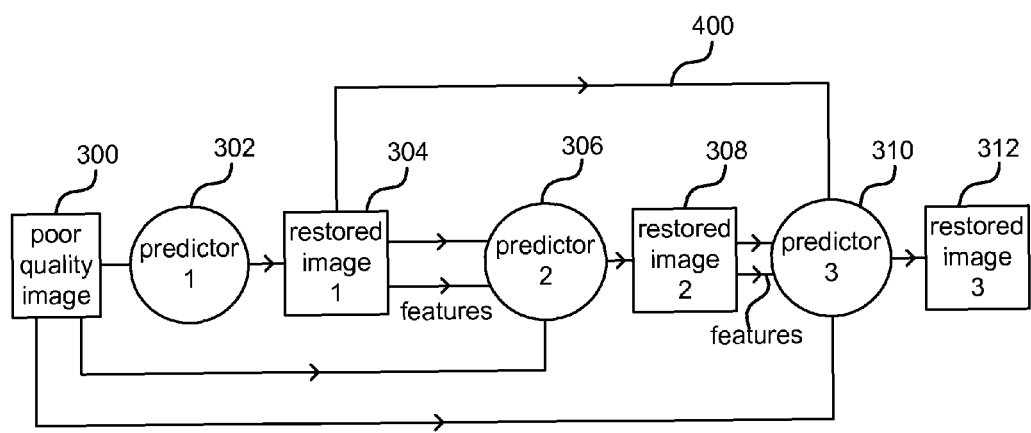
FIG. 4 is a schematic diagram of a cascade of trained machine learning predictors as in FIG. 3 and with output of a first predictor used as input to a plurality of subsequent layers of the cascade.

In some examples a predictor in an internal layer may also receive input from earlier layers, which are not the immediately previous layer. This is illustrated in FIG. 4 which is the same as FIG. 3 and in addition shows restored image 1 304 being used as input to predictor 3 310. It is also possible for features computed from restored image 1 304 to be used as input to predictor 3 310 (this is not shown in FIG. 4 for clarity).

In the examples in FIGS. 3 and 4 each cascade layer comprises a single predictor. However, it is also possible to use two or more predictors at each cascade layer. These predictors may be independent as illustrated in FIG. 5.

Figure 5:
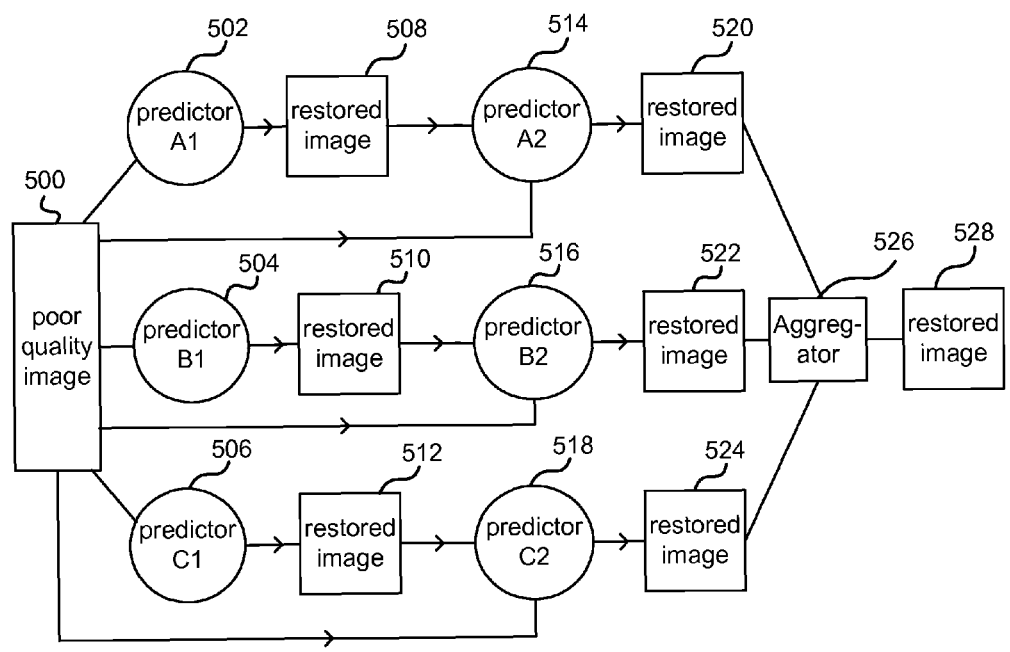
FIG. 5 is a schematic diagram of a cascade of trained machine learning predictors where each layer comprises a plurality of trained machine learning predictors.

FIG. 5 is a schematic diagram of a cascade of trained machine learning predictors where each layer comprises a plurality of trained machine learning predictors. For example, the initial layer comprises predictor A1 502, predictor B1 504 and predictor C1 506. A second layer comprises predictor A2 514, predictor B2 516 and predictor C2 518. Three predictors per cascade layer are shown in this example. However the number of predictors per layer may be different. There can be one or more predictor per layer depending on the particular task involved and the computational resources available.

As before, each predictor 502, 514, 504, 516, 506, 518 receives the poor quality image 500 as input and produces a restored image 508, 510, 512, 520, 522, 524 as output. Also, a predictor in an internal layer receives input which is the restored image output from the immediately previous layer and may also receive features computed from that restored image.

The restored images 520, 522, 524 output from the final layer are aggregated 526 to give a restored image 528. The aggregation may be a summing process, an averaging process, a weighted averaging process or any other aggregation process.

A predictor in an internal layer may also receive input from earlier layers, which are not the immediately previous layer. This is not shown in FIG. 5 for clarity but may be implemented in a similar manner as described above with respect to FIG. 4.

Figure 6:
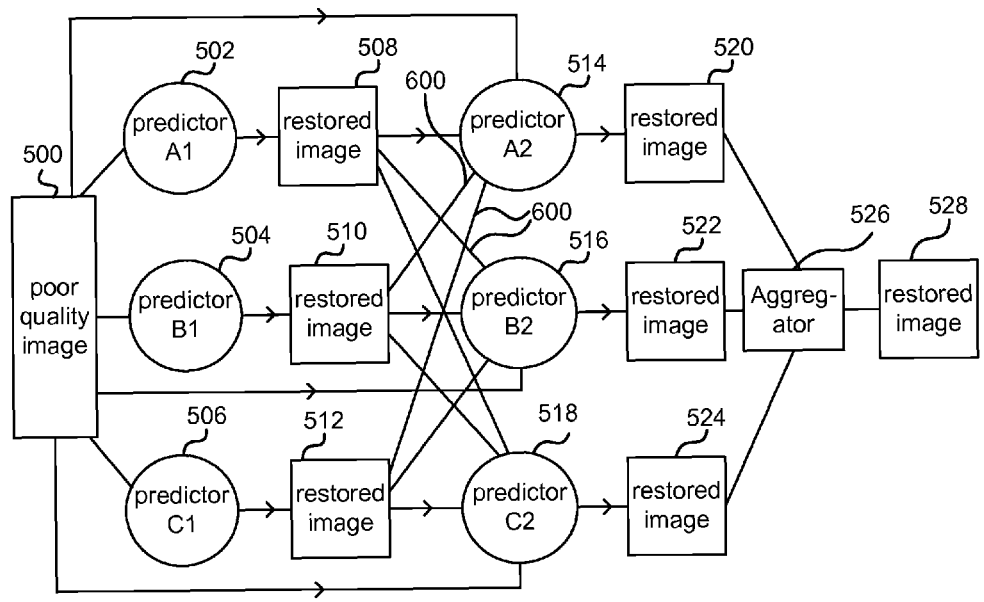
FIG. 6 is a schematic diagram of the cascade of FIG. 5 and with interconnections between rows of the cascade.

As mentioned above a layer can be thought of as a column having one or more rows. For example, in FIG. 5 layer 1 comprises predictors A1, B1 and C1 each of which may be thought of as a row of the same column. In some cascade architecture examples one or more connections between rows are used as illustrated in FIG. 6. FIG. 6 is the same as FIG. 5 but in addition shows connections 600 between rows. That is, a predictor in a given row may take input from a predictor in a different row of the previous layer. This is especially beneficial where certainty information is available for each of the restored images. In this case, the certainty information may be used to select or weight data (from the plurality of rows) to be input to subsequent layers of the cascade. In this way improved quality restored images are obtained.

Figure 7:
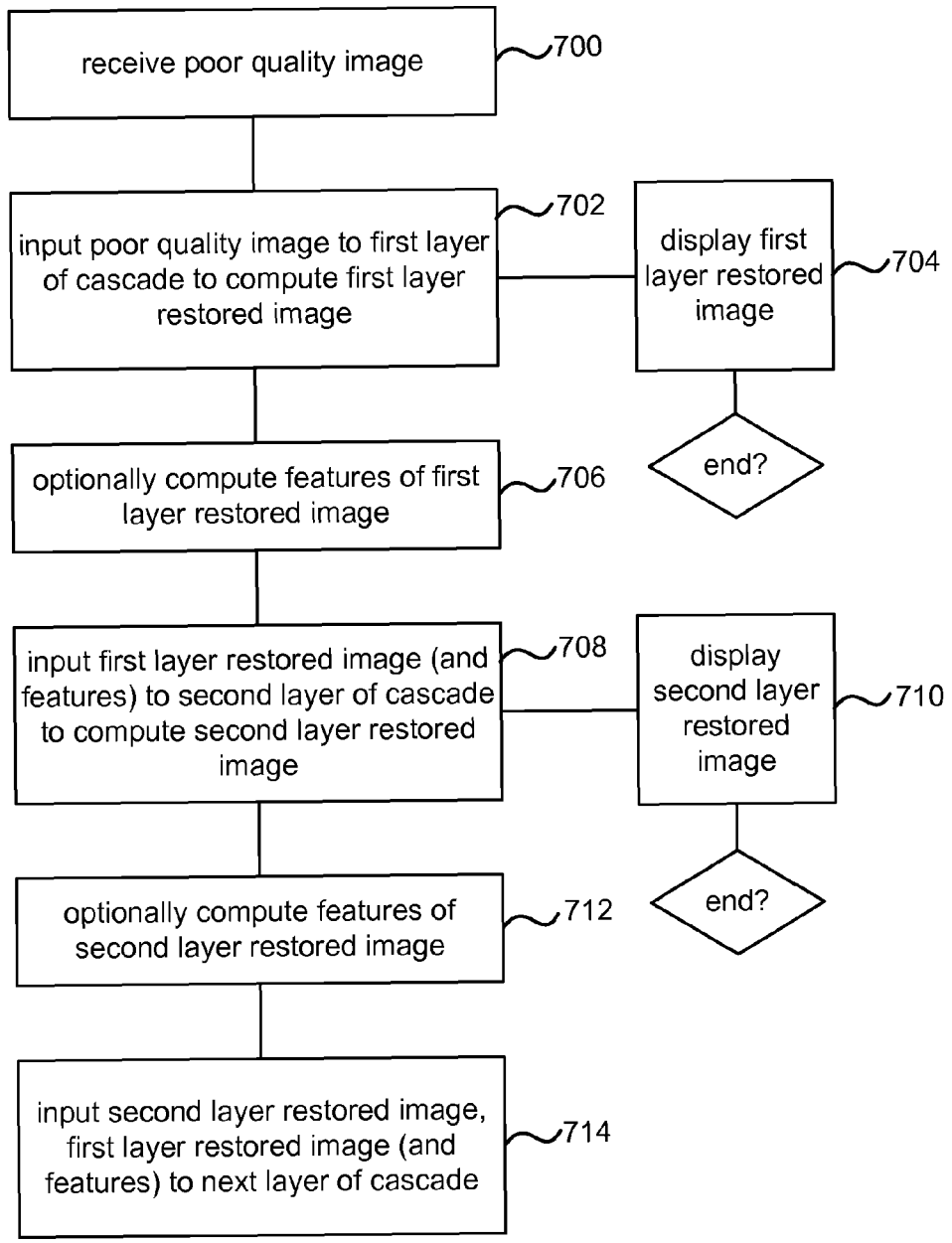
FIG. 7 is a flow diagram of a method of operation at a cascade of trained machine learning predictors.

FIG. 7 is a flow diagram of a method of operation at a cascade of trained machine learning predictors such as any of those described above with reference to FIGS. 3 to 6. A poor quality image is received 700 and input 702 to a first layer (having one or more predictors) of the cascade to compute at least one first layer restored image. In examples where one predictor is used in the first layer, one restored image is output and it may be displayed 704 at an end user device. The process may end or continue according to user input received. For example, the user may be happy with the first layer restored image. In examples where two or more predictors are used in the first layer, the first layer restored images may be aggregated to form a single first layer restored image for display at the end user device.

Optionally features are computed 706 from the first layer restored image(s) such as edges, corners, textures or other features.

The second layer of the cascade comprises one or more predictors. The first layer restored image(s) are input 708 together with the computed features if appropriate to a second layer of the cascade. The poor quality image is also input to the second layer of the cascade. During this input process there may be cross-communication between rows in the cascade layers (for example as illustrated in FIG. 6). Certainty information may be used to influence the cross-communication between the rows as described above with reference to FIG. 6.

The second layer of the cascade computes one or more second layer restored images. A second layer restored image (which may be an aggregate of several second layer restored images) is displayed 710 at an end user device and the process may end or continue according to user input received.

Optionally features are computed 712 from the second layer restored images. These features may be the same or different from the features computed from the first layer restored image.

The second stage restored images and features (where available) are input to the next layer of the cascade. The poor quality image is also input to the next layer of the cascade. In some examples, the first stage restored image is also input to the next layer of the cascade, optionally with the features computed from the first stage restored image. During this input process there may be cross-communication between rows in the cascade layers (for example as illustrated in FIG. 6). Certainty information may be used to influence the cross-communication between the rows as described above with reference to FIG. 6. A restored output image is then computed.

The process of FIG. 7 may be extended according to the number of layers of the cascade.

In the examples described herein the machine learning predictors are trained using training data 800 comprising pairs of poor quality images and corresponding high quality restored images. The training data may comprise empirical images and/or synthesized images and the particular training data used depends on the particular task for which the image restoration system is to be used (e.g. de-blurring, de-noising or other). The training data may be partitioned by a partitioning system 802 into training data sets 804, 806, 808 so that each machine learning predictor in a given cascade may be trained on a different training data set. In this way the ability of the cascade system to generalize is enhanced.

The partitioning system may create the partitioned training data sets by simply dividing the training data or by using resampling, such as bootstrap resampling or any other resampling method. Bootstrap resampling is a process whereby random samples are taken (with replacement) from the original training data 800 and used to form a training data set 804, 806, 808. Because the samples are taken with replacement it is possible for a value to occur more than once in the sample.

Figure 8:
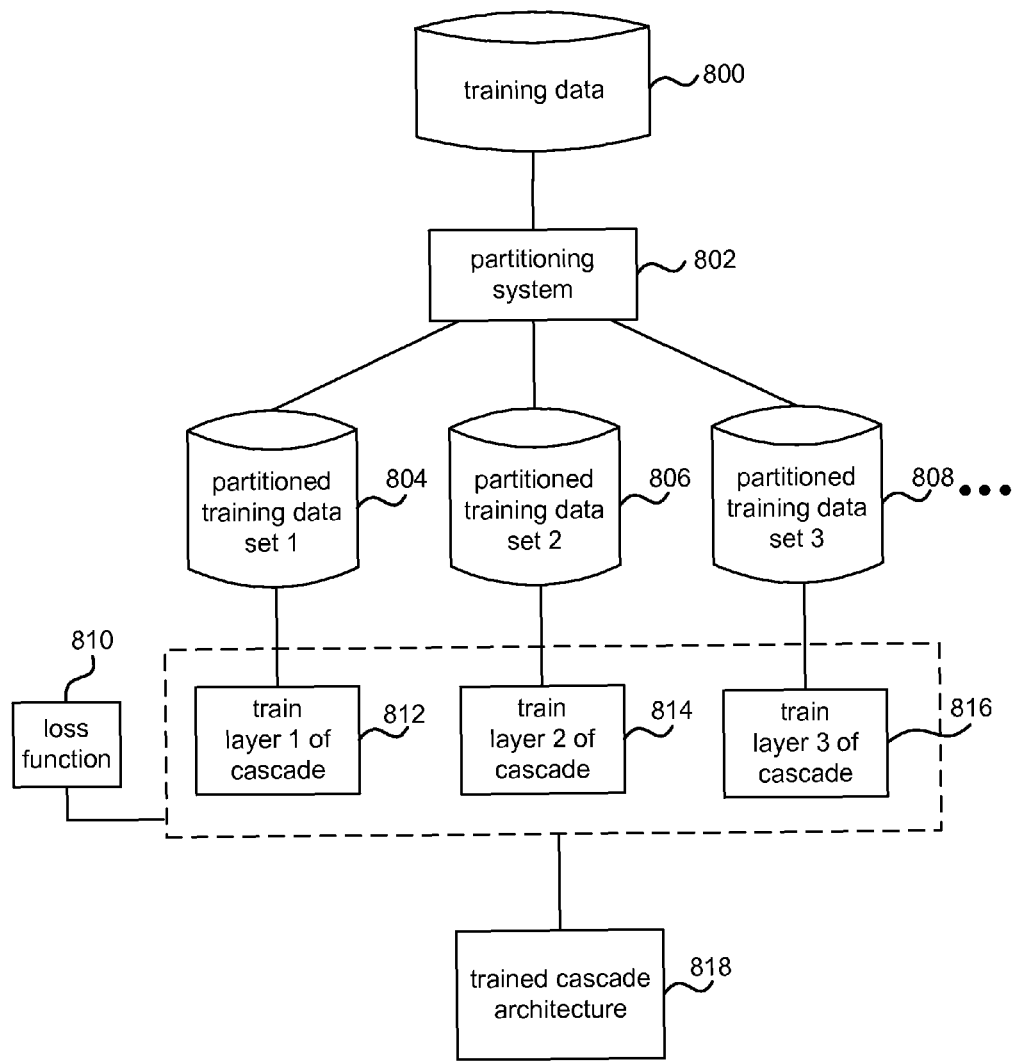
FIG. 8 is a schematic diagram of equipment and process for training a cascade architecture.

In the example illustrated in FIG. 8 a cascade architecture with three layers 812, 814, 816 is trained to produce a trained cascade architecture 818. Each layer comprising a single predictor in this example. In examples where a layer of the cascade comprises multiple predictors, these are trained using additional training data sets partitioned from the original training data 800. In this way each machine learning predictor in a given cascade may be trained on a different training data set.

During training a loss function 810 is used to enable updates to be made to the predictors in the light of the training data examples. The loss function 810 expresses a quality of restoration between input and output images of a trained machine learning predictor and is directly optimized during training. For example the loss function may comprise peak signal to noise ratio (PSNR), mean squared error (MSE), mean absolute deviation (MAD), or structural image similarity (SSIM). These are examples; other types of loss function may be used which express a quality of restoration between input and output images of a predictor. The loss function may be specified by a user, or may be preconfigured. In some examples, the loss function is selected automatically from possible loss functions according to the particular image restoration task (e.g. image deblurring or other).

Figure 9:
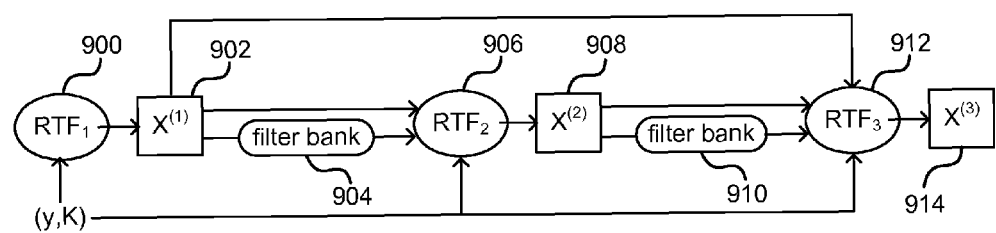
FIG. 9 is a schematic diagram of a cascade architecture for image deblurring or image denoising.

An example in which the image restoration task comprises image deblurring is now given with respect to FIG. 9. In this example the image restoration cascade comprises at least three layers namely RTF 1 900, RTF 2 906 and RTF 3 912. Each layer receives as input a blurry image indicated by the symbol y in FIG. 9 as well as a blur matrix K. Each layer outputs a de-blurred image 902, 908, 914. This enables a trade-off between computational resources and quality to be made by stopping after a certain stage.

The blur matrix K is a matrix of size N by N where N is the number of image elements. It may be multiplied with the image in order to convolve a blur kernel with the image. A blur kernel is a plurality of numerical values expressing at least part of the blur present in the blurry image y. The blur kernel may be obtained from a blur kernel estimator. Any suitable computer-implemented blur kernel estimator 202 may be used. For example, as described in any of the following publications: Cho et al. "Fast motion deblurring" ACM T. Graphics, 28, 2009; Fergus et al. "Removing camera shake from a single photograph." ACM T. Graphics, 3(25), 2006; Levin et al. "Efficient marginal likelihood optimization in blind deconvolution" CVPR 2011; Xu et al. "Two-phase kernel estimation for robust motion deblurring", ECCV 2010.

The first layer of the cascade comprises RTF 1 900 which linearly regresses parameters of unary and pairwise potentials of a Gaussian conditional random field (CRF) with an 8 connected graph structure (or other structure). The Gaussian CRF is used to express a blur function as described in US patent application "Image Deblurring" filed on 14 Apr. 2013 and having application Ser. No. 13/862,415. The blur function expresses the probability of a sharp image given a blurred form of the sharp image and a fixed blur kernel estimate. The blur function is expressed as a Gaussian CRF as follows:

$$p(x|y,K)$$

Which may be expressed in words as: the probability of sharp image x given blurred input image y and a fixed blur matrix K (expressing the blur kernel).

RTF 1 900 is able to remove the dominant blur from the input image and makes it much easier for subsequent RTF stages to regress good potentials for the CRF. Besides the blurred input image, the second stage, RTF 2 906 uses the output of RTF 1 as input. Additionally a filter bank 904 is evaluated on the output of RTF 1 to obtain more expressive features. For example, filters such as those described in "Field of Experts" Roth et al. IJCV, 82(2):205-229, 2009 or any other filters. The features may be used for the splits tests in the regression tree as well as for the linear potential parameter regressor stored in each leaf of the tree. Regression trees of depth 7 or other suitable depth may be used.

In one example, subsequent cascade stages (RTF3, RTF 4 etc.) take as input the outputs from all previous stages, where the filter bank 910 is evaluated on the directly preceding model output only. Starting with RTF 2, the Gaussian CRF at each layer may use a 24-connected graph structure (or other structure). Due to the increased amount of model parameters at the internal layers of the cascade these internal layers may be trained using more training data examples than for the first layer. A loss function such as PSNR may be used during training as described above.

An example in which the image restoration task comprises image denoising is now given with respect to FIG. 9. In this example the input image y is a noisy image for example, due to white Gaussian noise or due to structured noise from JPEG blocking artefacts or other structured noise sources. Each layer of the cascade comprises a regression tree field which takes as input the noisy image and the output of all previous layers (no blur matrix K is used here). A filter bank may be used to compute features for input to various ones of the layers in a similar manner to that described above for image deblurring. Each RTF predicts values of parameters of a CRF which expresses the probability of a noise-free image given a noisy form of the same image. For a given noisy input image, the noise-free version is then determined by finding the most likely image according to the probability distribution expressed by the CRF.

Figure 10:
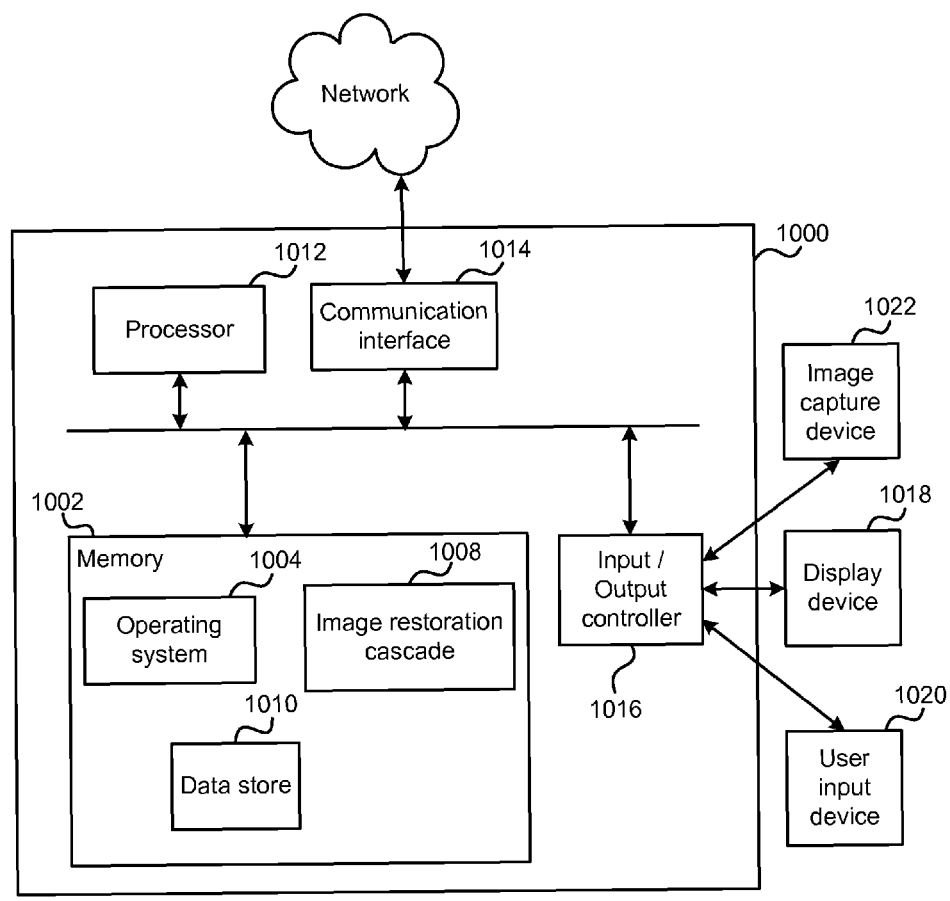
FIG. 10 illustrates an exemplary computing-based device in which embodiments of an image restoration cascade may be implemented.

FIG. 10 illustrates various components of an exemplary computing-based device 1000 which may be implemented as any form of a computing and/or electronic device, and in which embodiments of an image restoration engine or an image capture device incorporating an image restoration engine may be implemented.

Computing-based device 1000 comprises one or more processors 1002 which may be microprocessors, controllers or any other suitable type of processors for processing computer executable instructions to control the operation of the device in order to calculate a restored image from a poor quality image. One or more of the processors may comprise a graphics processing unit or other parallel computing unit arranged to perform operations on image elements in parallel. In some examples, for example where a system on a chip architecture is used, the processors 1002 may include one or more fixed function blocks (also referred to as accelerators) which implement a part of the method of image restoration in hardware (rather than software or firmware).

Platform software comprising an operating system 1004 or any other suitable platform software may be provided at the computing-based device to enable software implementing an image restoration cascade 1008 or at least part of the image restoration cascade described herein to be executed on the device. A data store 1010 at memory 1012 may store training data, images, parameter values, or other data.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to indicate when restoration is to be applied to an image, to select restored images to be stored, to select one of a series of restored images in order to stop processing through the cascade, to view images, to specify or select a loss function or for other purposes. In an embodiment the display device 1018 may also act as the user input device 1020 if it is a touch sensitive display device. The input/output controller 1016 may also output data to devices other than the display device, e.g. a locally connected printing device.

Any of the input/output controller 1016, display device 1018 and the user input device 1020 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of restoring an image comprising:
   receiving, at a processor, a poor quality image;
   applying the poor quality image to each of a plurality of trained machine learning predictors which are arranged in a cascade architecture, the cascade architecture comprising a plurality of layers connected in series, each layer comprising at least one of the trained machine learning predictors, each internal layer of the cascade architecture being trained using more training data examples than the first layer of the cascade architecture;
   obtaining from each of the trained machine learning predictors, a restored version of the poor quality image.

2. A method as claimed in claim 1 wherein the cascade architecture comprises at least three layers and at least one internal layer receives at least some input from at least one earlier layer other than the immediately previous layer.

3. A method as claimed in claim 1 comprising displaying one or more of the restored versions of the poor quality image at an end user device and, in response to user input, stopping application of the poor quality image to at least some of the plurality of trained machine learning predictors.

4. A method as claimed in claim 1 comprising applying the poor quality image to the plurality of trained machine learning predictors by sending the poor quality image to an image restoration cascade over a communications network.

5. A method as claimed in claim 1 where trained machine learning predictors in internal layers of the cascade architecture receive input from one or more trained machine learning predictors of earlier layers.

6. A method as claimed in claim 1 where at least two of the layers of the cascade architecture comprise a plurality of trained machine learning predictors arranged in rows.

7. A method as claimed in claim 1 comprising obtaining from each of the trained machine learning predictors, certainty information associated with the restored versions of the poor quality image.

8. A method as claimed in claim 6 comprising: obtaining from each of the trained machine learning predictors, certainty information associated with the restored versions of the poor quality image; and using the certainty information to select or weight data input to layers of the cascade architecture.

9. A method as claimed in claim 1 comprising training the plurality of machine learning predictors using a loss function which expresses restoration quality between a poor quality image and a restored version of the poor quality image.

10. A method as claimed in claim 1 comprising training each of the machine learning predictors using a different training data set.

11. A method as claimed in claim 1 wherein the trained machine learning predictors are non-parametric.

12. A method as claimed in claim 1 wherein each trained machine learning predictor is any of: a neural network, a linear regression model, a regression tree, a regression tree field.

13. A method of restoring an image comprising:
    receiving, at a processor, a poor quality image;
    applying the poor quality image to a plurality of trained machine learning predictors which are arranged in a cascade architecture, the cascade architecture comprising a plurality of layers connected in series, each layer comprising at least one of the trained machine learning predictors, each internal layer of the cascade architecture being trained using more training data examples than the first layer of the cascade architecture;
    obtaining at least one of a series of restored versions of the poor quality image from the trained machine learning predictors;
    displaying the obtained restored versions of the poor quality image and monitoring for user input;
    in response to user input, stopping application of the poor quality image to at least some of the plurality of trained machine learning predictors.

14. An image restoration engine comprising:
    a processor arranged to receive a poor quality image; and
    a plurality of trained machine learning predictors arranged to use the poor quality image to calculate restored versions of the poor quality image, the plurality of trained machine learning predictors being arranged in a cascade architecture, the cascade architecture comprising a plurality of layers connected in series, each layer comprising at least one of the trained machine learning predictors, each internal layer of the cascade architecture being trained using more training data examples than the first layer of the cascade architecture.

15. An image restoration engine as claimed in claim 14 where at least one internal layer receives image features of at least one of the restored versions of the poor quality image as input.

16. An image restoration engine as claimed in claim 14 where trained machine learning predictors in internal layers of the cascade architecture receive input from one or more trained machine learning predictors of earlier layers.

17. An image restoration engine as claimed in claim 14 comprising obtaining from each of the trained machine learning predictors, certainty information associated with the restored versions of the poor quality image.

18. An image restoration engine as claimed in claim 14 where each of the machine learning predictors has been trained using a different training data set.

19. An image restoration engine as claimed in claim 14 wherein each trained machine learning predictor is any of: a neural network, a linear regression model, a regression tree, a regression tree field.

20. An image restoration engine as claimed in claim 14 which is at least partially implemented using hardware logic selected from any one or more of: a field-programmable gate array, a program-specific integrated circuit, a program-specific standard product, a system-on-a-chip, a complex programmable logic device, a graphics processing unit.

* * * * *